(12) United States Patent
Shaaban et al.

(10) Patent No.: US 12,084,533 B1
(45) Date of Patent: Sep. 10, 2024

(54) SYNTHESIS OF NON-IONIC HYDROGELS FOR NON-IONIC POLLUTANT REMOVAL

(71) Applicant: KING FAISAL UNIVERSITY, Al-Ahsa (SA)

(72) Inventors: Saad Shaaban, Al-Ahsa (SA); Manal Amin Hessien, Liverpool (GB); Amr Negm, Liverpool (GB); Tarek A. Yousef, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/581,246

(22) Filed: Feb. 19, 2024

(51) Int. Cl.
| | |
|---|---|
| C08F 289/00 | (2006.01) |
| B01D 67/00 | (2006.01) |
| B01D 71/10 | (2006.01) |
| B01D 71/82 | (2006.01) |
| C02F 1/44 | (2023.01) |
| C02F 101/30 | (2006.01) |
| C08H 8/00 | (2010.01) |
| C08J 5/18 | (2006.01) |

(52) U.S. Cl.
CPC ........ *C08F 289/00* (2013.01); *B01D 67/0011* (2013.01); *B01D 67/0013* (2013.01); *B01D 71/10* (2013.01); *B01D 71/82* (2013.01); *C02F 1/44* (2013.01); *C08H 8/00* (2013.01); *C08J 5/18* (2013.01); *B01D 2323/08* (2013.01); *B01D 2323/42* (2013.01); *C02F 2101/301* (2013.01); *C08J 2351/08* (2013.01)

(58) Field of Classification Search
None
See application file for complete search history.

(56) References Cited

U.S. PATENT DOCUMENTS

| | | | | |
|---|---|---|---|---|
| 6,293,972 B1 * | 9/2001 | Yamaguchi | ......... | D06M 15/277 536/75 |
| 8,975,387 B1 * | 3/2015 | Venditti | ................. | C08B 31/12 536/102 |

FOREIGN PATENT DOCUMENTS

| | | | |
|---|---|---|---|
| CN | 109967008 A | * | 7/2019 |
| CN | 114920979 B | | 4/2023 |
| EP | 3469016 B1 | | 12/2022 |

OTHER PUBLICATIONS

Deance et al, ACS Appl. Polym. Mater. 2023, 5, 10021-10031 (Year: 2023).*
Smith, Chapter 1, ACS Symposium Series; American Chemical Society: Washington, DC, 2019 (Year: 2019).*
Wang et al ACS Symposium Series; American Chemical Society: Washington, DC, 2019 (Year: 2018).*
Rajan et al Biomacromolecules 2018, 19, 2665-2672 (Year: 2018).*
Alipoormazandarani et al Industrial Crops & Products 154 (2020) 112728 (Year: 2020).*
Khan, Biomacromolecules 2004, 5, 1078-1088 (Year: 2004).*
Gujjala et al Green Chem., 2022, 24, 9579 (Year: 2022).*
Athinarayanan et al ACS Omega 2022, 7, 19270-19279 (Year: 2022).*
Shuang Shan, Xiao-Feng Sun, Yangyang Xie, Wenbo Li and Tiezheng Ji, "High-Performance Hydrogel Adsorbent Based on Cellulose, Hemicellulose, and Lignin for BBCopper(II) Ion Removal" DOI: https://doi.org/10.3390/polym13183063.
Shao-Fei Sun, He-Fei Wan, Xin Zhao, Ce Gao, Ling-Ping Xiao, Run-Cang Sun, "Facile construction of lignin-based network composite hydrogel for efficient adsorption of methylene blue from wastewater" DOI: https://doi.org/10.1016/j.ijbiomac.2023.126688.
Giuseppe Melilli, Jenevieve Yao, Annalisa Chiappone, Marco Sangermano, Minna Hakkarainen "Photocurable "all-lignocellulose" derived hydrogel nanocomposites for adsorption of cationic contaminants" DOI: https://doi.org/10.1016/j.susmat.2020.e00243.

* cited by examiner

*Primary Examiner* — Krishnan S Menon
(74) *Attorney, Agent, or Firm* — Nath, Goldberg & Meyer; Joshua B. Goldberg

(57) ABSTRACT

A method of making a lignocellulose incorporating methacrylate functionality from date palm biomass can include extracting sieved date palm biomass at a first predetermined temperature (110° C.) to obtain an extracted date palm biomass; adding an acid to the extracted date palm biomass to obtain a mixture and stirring and refluxing the mixture at a second predetermined temperature (100° C.) to obtain a refluxed cellulose-hemicellulose-lignin residue; dissolving the refluxed cellulose-hemicellulose-lignin residue in a solvent to obtain a solution; adding triethylamine and methacrylic anhydride to the solution to obtain a reaction solution mixture and stirring while heating the reaction solution mixture to react the triethylamine and the methacrylic anhydride with the solution to obtain a reacted solution mixture; pouring the reacted solution mixture into an ice-cold solvent to obtain a solution mixture and separating cellulose-hemicellulose-lignin residue from the solution mixture via centrifuging; dissolving centrifuged cellulose-lignin residue in water to obtain the lignocellulose incorporating methacrylate functionality.

14 Claims, No Drawings

SYNTHESIS OF NON-IONIC HYDROGELS FOR NON-IONIC POLLUTANT REMOVAL

FIELD AND BACKGROUND

The disclosure of the present application relates to a method of making a polymeric membrane for removing pollutants from an aqueous solution.

DESCRIPTION OF THE PRIOR ART

Water covers about 71% of the Earth's surface. It is essential for the existence of all forms of life. Humans, microbes, plants, trees, and aquatic animals depend on water to survive. Without water, all living organisms will fail to exist.

Water also plays an important role in the world economy. It is a critical resource for agricultural production and plays an important role in global food security. Water is also a fundamental commodity, used by many industries, for almost every step of manufacturing and production processes around the world. Some examples of these industries are textile, leather, plastic, clothing, footwear, cosmetic, paint, pharmaceutical, paper, and printing.

However, most of the mentioned industries are known to discharge heavy metals and dyes from their waste effluents which end up in the environment, causing water pollution in the wastewater.

Some of the heavy metals discharged by these industries include cadmium, chromium, lead, copper, and zinc. The rise of these heavy metals increases the toxicity of available drinkable water in various water bodies such as rivers, lakes, and groundwater tables. Heavy metals are highly toxic even at very low concentrations and can be fatal if consumed.

Some examples of dyes discharged by the mentioned industries include Gentian violet, methylene blue, methyl orange, Rhodamine B, and Congo red. These dyes are non-biodegradable, extremely toxic, and may be carcinogenic. In humans, Gentian violet dye is known to cause gastrointestinal irritation, depression in the white blood cell count via intravenous injection, blindness if swallowed, and eye and skin irritation. If the wastewater containing these dyes are left untreated, it poses a serious risk to the aquatic ecosystem since the dyes prevent sunlight from entering the water resulting in impairment of plant photosynthesis.

There are several methods available for the removal of heavy metals from wastewater, such as adsorption, biological oxidation, coagulation, and membrane separation. The adsorption process has been shown to be an effective and technically feasible process for the heavy metal uptake from aqueous solutions. However, known adsorbents have a low adsorption capacity for the sorption of heavy metals.

As for dye removal, there are several known methods such as activated carbon powder, membrane separation, coagulation, ozonation, electrochemical coagulation, photocatalytic degradation, cation exchange membranes, and adsorption. Activated carbon powder requires a filtration membrane to separate the filtrate and the adsorbent. Known adsorbents have a low adsorption capacity for the sorption of dyes.

In light of the above, a need remains for an efficient, rapid, cost-effective, and an environmentally friendly method for making a polymeric membrane for removing pollutants (i.e., heavy metal, organic dye, and phenol) from an aqueous solution (i.e., wastewater).

SUMMARY

The present subject matter relates to a method of making a lignocellulose incorporating methacrylate functionality from date palm biomass and using the formed lignocellulose incorporating methacrylate functionality to produce a lignocellulose non-ionic hydrogel. The present subject matter further relates to using the formed lignocellulose non-ionic hydrogel to produce a polymeric membrane, which, in some embodiments, can be used for removing pollutants (i.e., heavy metal, organic dye, and phenol) from an aqueous solution (i.e., wastewater).

In one embodiment, the method of making a lignocellulose incorporating methacrylate functionality from date palm biomass includes obtaining date palm biomass; drying the date palm biomass to obtain a dried date palm biomass; sieving the dried date palm biomass to obtain a sieved date palm biomass; extracting the sieved date palm biomass at a first predetermined temperature to remove waxes and resins from the sieved date palm biomass to obtain an extracted date palm biomass; drying the extracted date palm biomass to obtain a dried extracted date palm biomass; adding an acid to the dried extracted date palm biomass to obtain a mixture and continuously stirring and refluxing the mixture at a second predetermined temperature to obtain a refluxed cellulose-hemicellulose-lignin (lignocellulose) residue; cooling the refluxed cellulose-hemicellulose-lignin residue; dissolving the refluxed cellulose-hemicellulose-lignin residue in a solvent to obtain a solution; adding triethylamine and methacrylic anhydride (methacrylate functionality) to the solution to obtain a reaction solution mixture and stirring while heating the reaction solution mixture to react the triethylamine and the methacrylic anhydride with the solution to obtain a reacted solution mixture; pouring the reacted solution mixture into an ice-cold solvent to obtain a solution mixture and separating cellulose-hemicellulose-lignin residue from the solution mixture via centrifuging to obtain a centrifuged cellulose-hemicellulose-lignin residue; drying the centrifuged cellulose-hemicellulose-lignin residue to obtain a dried centrifuged cellulose-hemicellulose-lignin residue; and dissolving the dried centrifuged cellulose-lignin residue in water to obtain the lignocellulose incorporating methacrylate functionality.

In a further embodiment, the present subject matter relates to a lignocellulose incorporating methacrylate functionality from date palm biomass prepared by the above method.

In an embodiment, the extracted date palm biomass can be prepared by extracting about 100 g of the sieved date palm biomass in a presence of a toluene and an ethanol mixture at the first predetermined temperature for about 6 hours via a Soxhlet extractor to remove the waxes and the resins from the sieved date palm biomass, and wherein a ratio of the toluene to the ethanol is about 2:1, w/w.

In an additional embodiment, the refluxed cellulose-hemicellulose-lignin residue can be prepared by adding about 1 L of about 0.1 M hydrochloric acid to about 40 g of the dried extracted date palm biomass to obtain the mixture and continuously stirring and refluxing the mixture at the second predetermined temperature for about 6 hours.

In another embodiment, the solution can be prepared by dissolving about 6 g of the refluxed cellulose-hemicellulose-lignin residue in about 240 mL of dimethyl sulfoxide solvent.

In a further embodiment, the reacted solution mixture can be prepared by adding the triethylamine and the methacrylic anhydride to the solution to obtain the reaction solution mixture and magnetically stirring while heating the reaction solution mixture at about 50° C. for about 4 days to react the triethylamine and the methacrylic anhydride with the solution, and wherein a ratio of the triethylamine to the methacrylic anhydride is about 1:4, w/w.

In an embodiment, the centrifuged cellulose-hemicellulose-lignin residue can be prepared by pouring the reacted solution mixture into about 1 L of the ice-cold solvent comprising isopropanol to obtain the solution mixture and separating the cellulose-hemicellulose-lignin residue from the solution mixture via centrifuging.

In an additional embodiment, the lignocellulose incorporating methacrylate functionality can be prepared by dissolving about 2 g of the dried centrifuged cellulose-lignin residue in about 20 mL of deionized water.

In a further embodiment, the present subject matter relates to a method of making a lignocellulose non-ionic hydrogel which includes obtaining date palm biomass; drying the date palm biomass to obtain a dried date palm biomass; sieving the dried date palm biomass to obtain a sieved date palm biomass; extracting the sieved date palm biomass at a first predetermined temperature to remove waxes and resins from the sieved date palm biomass to obtain an extracted date palm biomass; drying the extracted date palm biomass to obtain a dried extracted date palm biomass; adding an acid to the dried extracted date palm biomass to obtain a mixture and continuously stirring and refluxing the mixture at a second predetermined temperature to obtain a refluxed cellulose-hemicellulose-lignin (lignocellulose) residue; cooling the refluxed cellulose-hemicellulose-lignin residue; dissolving the refluxed cellulose-hemicellulose-lignin residue in a solvent to obtain a solution; adding triethylamine and methacrylic anhydride (methacrylate functionality) to the solution to obtain a reaction solution mixture and stirring while heating the reaction solution mixture to react the triethylamine and the methacrylic anhydride with the solution to obtain a reacted solution mixture; pouring the reacted solution mixture in an ice-cold solvent to obtain a solution mixture and separating cellulose-hemicellulose-lignin residue from the solution mixture via centrifuging to obtain a centrifuged cellulose-hemicellulose-lignin residue; drying the centrifuged cellulose-hemicellulose-lignin residue to obtain a dried centrifuged cellulose-hemicellulose-lignin residue; dissolving the dried centrifuged cellulose-lignin residue in water to obtain a lignocellulose incorporating methacrylate functionality; copolymerizing vinyl acetate with 1,1'-(diselanediylbis(4,1-phenylene))bis(1H-pyrrole-2,5-dione) in a presence of the lignocellulose incorporating methacrylate functionality to obtain a lignocellulose non-ionic hydrogel, and wherein the copolymerization step includes adding polymerization initiators; cutting the lignocellulose non-ionic hydrogel into pieces to obtain lignocellulose non-ionic hydrogel cut pieces; and drying the lignocellulose non-ionic hydrogel cut pieces to obtain dried lignocellulose non-ionic hydrogel cut pieces.

In an aspect, the present subject matter relates to a lignocellulose non-ionic hydrogel prepared by the above method.

In an embodiment, the lignocellulose non-ionic hydrogel can be prepared by copolymerizing about 200 μL of the vinyl acetate with about 200 μL of the 1,1'-(diselanediylbis(4,1-phenylene))bis(1H-pyrrole-2,5-dione) in the presence of the lignocellulose incorporating methacrylate functionality for about 8 hours, and wherein the copolymerization step includes adding the polymerization initiators comprising ammonium peroxodisulfate (($NH_4$)$_2S_2O_8$) and sodium metabisulfite ($Na_2S_2O_5$) at a ratio of about 2 wt % of the ammonium peroxodisulfate to about 2 wt % of the sodium metabisulfite.

In an additional embodiment, the lignocellulose non-ionic hydrogel cut pieces can be prepared by cutting spurs of the lignocellulose non-ionic hydrogel into pieces.

In another embodiment, the lignocellulose non-ionic hydrogel cut pieces can be dipped into an excess amount of deionized water for about 4 days prior to the drying step.

In an embodiment, the dried lignocellulose non-ionic hydrogel cut pieces can be prepared by drying the lignocellulose non-ionic hydrogel cut pieces on a Teflon foil at about 22° C.

In a further embodiment, the present subject matter relates to a method of making a polymeric membrane which includes obtaining date palm biomass; drying the date palm biomass to obtain a dried date palm biomass; sieving the dried date palm biomass to obtain a sieved date palm biomass; extracting the sieved date palm biomass at a first predetermined temperature to remove waxes and resins from the sieved date palm biomass to obtain an extracted date palm biomass; drying the extracted date palm biomass to obtain a dried extracted date palm biomass; adding an acid to the dried extracted date palm biomass to obtain a mixture and continuously stirring and refluxing the mixture at a second predetermined temperature to obtain a refluxed cellulose-hemicellulose-lignin (lignocellulose) residue; cooling the refluxed cellulose-hemicellulose-lignin residue; dissolving the refluxed cellulose-hemicellulose-lignin residue in a solvent to obtain a solution; adding triethylamine and methacrylic anhydride (methacrylate functionality) to the solution to obtain a reaction solution mixture and stirring while heating the reaction solution mixture to react the triethylamine and the methacrylic anhydride with the solution to obtain a reacted solution mixture; pouring the reacted solution mixture in an ice-cold solvent to obtain a solution mixture and separating cellulose-hemicellulose-lignin residue from the solution mixture via centrifuging to obtain a centrifuged cellulose-hemicellulose-lignin residue; drying the centrifuged cellulose-hemicellulose-lignin residue to obtain a dried centrifuged cellulose-hemicellulose-lignin residue; dissolving the dried centrifuged cellulose-lignin residue in water to obtain a lignocellulose incorporating methacrylate functionality copolymerizing vinyl acetate with 1,1'-(diselanediylbis(4,1-phenylene))bis(1H-pyrrole-2,5-dione) in a presence of the lignocellulose incorporating methacrylate functionality to obtain a lignocellulose non-ionic hydrogel, and wherein the copolymerization step includes adding polymerization initiators; cutting the lignocellulose non-ionic hydrogel into pieces to obtain lignocellulose non-ionic hydrogel cut pieces; drying the lignocellulose non-ionic hydrogel cut pieces to obtain dried lignocellulose non-ionic hydrogel cut pieces; adding dimethylformamide (DMF) to the dried lignocellulose non-ionic hydrogel cut pieces within a casting knife to obtain a coating composition; casting the coating composition onto an automatic film applicator to obtain a casted coating composition and immersing the casted coating composition on the automatic film applicator into a coagulation bath to obtain the polymeric membrane; and drying the polymeric membrane to obtain dried polymeric membrane.

In another aspect, the present subject matter relates to a polymeric membrane prepared by the above method.

In an embodiment, the polymeric membrane can be prepared by casting the coating composition onto a steel sheet of the automatic film applicator to obtain the casted coating composition and immersing the casted coating composition on the steel sheet of the automatic film applicator into the coagulation bath filled with distilled water for about 24 hours, and wherein the steel sheet of the automatic film applicator is at a temperate of about 27° C. with a rotational speed of about 6 rpm.

In a further embodiment, the present subject matter relates to a method of removing pollutants from an aqueous solution, the method includes contacting the polymeric membrane prepared by the above method with the aqueous solution.

In an embodiment, the aqueous solution can include wastewater.

In another embodiment, the pollutants can be selected from the group consisting of cadmium, chromium, lead, copper, zinc, other heavy metals, Rhodamine B, Alizarin red, Indigo carmine, Gentian violet, other organic dyes, phenols, and combinations thereof.

These and other features of the present subject matter will become readily apparent upon further review of the following specification.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of making a lignocellulose incorporating methacrylate functionality from date palm biomass and using the formed lignocellulose incorporating methacrylate functionality to produce a lignocellulose non-ionic hydrogel. The present subject matter further relates to using the formed lignocellulose non-ionic hydrogel to produce a polymeric membrane, which, in some embodiments, can be used for removing pollutants (i.e., heavy metal, organic dye, and phenol) from an aqueous solution (i.e., wastewater).

In one embodiment, the method of making a lignocellulose incorporating methacrylate functionality from date palm biomass includes obtaining date palm biomass; drying the date palm biomass to obtain a dried date palm biomass; sieving the dried date palm biomass to obtain a sieved date palm biomass; extracting the sieved date palm biomass at a first predetermined temperature (110° C.) to remove waxes and resins from the sieved date palm biomass to obtain an extracted date palm biomass; drying the extracted date palm biomass to obtain a dried extracted date palm biomass; adding an acid to the dried extracted date palm biomass to obtain a mixture and continuously stirring and refluxing the mixture at a second predetermined temperature (100° C.) to obtain a refluxed cellulose-hemicellulose-lignin (lignocellulose) residue; cooling the refluxed cellulose-hemicellulose-lignin residue; dissolving the refluxed cellulose-hemicellulose-lignin residue in a solvent to obtain a solution; adding triethylamine and methacrylic anhydride (methacrylate functionality) to the solution to obtain a reaction solution mixture and stirring while heating the reaction solution mixture to react the triethylamine and the methacrylic anhydride with the solution to obtain a reacted solution mixture; pouring the reacted solution mixture into an ice-cold solvent to obtain a solution mixture and separating cellulose-hemicellulose-lignin residue from the solution mixture via centrifuging to obtain a centrifuged cellulose-hemicellulose-lignin residue; drying the centrifuged cellulose-hemicellulose-lignin residue to obtain a dried centrifuged cellulose-hemicellulose-lignin residue; and dissolving the dried centrifuged cellulose-lignin residue in water to obtain the lignocellulose incorporating methacrylate functionality.

In a further embodiment, the present subject matter relates to a lignocellulose incorporating methacrylate functionality from date palm biomass prepared by the above method.

In an embodiment, the method can include obtaining date palm biomass from a palm fruit trunk. The date palm biomass contains cellulose, hemicellulose, and lignin. The obtained date palm biomass can be successively washed with deionized water to remove dust and any unwanted impurities from the date palm biomass. Afterward, the washed date palm biomass can be dried at about room temperature to obtain dried date palm biomass. Thereafter, about 100 g of the dried date palm biomass can be sieved using about 200 um mesh to obtain a sieved date palm biomass.

Subsequently, about 100 g of the sieved date palm biomass can be extracted in a presence of a toluene and an ethanol mixture at a first predetermined temperature (110° C.) for about 6 hours via a Soxhlet extractor to remove waxes and resins from the sieved date palm biomass to obtain an extracted date palm biomass. A ratio of the toluene to the ethanol can be about 2:1, w/w.

In an additional embodiment, the extracted date palm biomass can be dried and about 40 g of the dried extracted date palm biomass can be weighed.

In another embodiment, about 1 L of about 0.1 M hydrochloric acid can be added to the about 40 g of the dried extracted date palm biomass within about 2 L flask to obtain a mixture. The mixture can be continuously stirred and refluxed at a second predetermined temperature (100° C.) for about 6 hours to obtain a refluxed cellulose-hemicellulose-lignin (lignocellulose) residue. Then, the refluxed cellulose-hemicellulose-lignin residue can be cooled.

In a further embodiment, the cooled refluxed cellulose-hemicellulose-lignin residue can be filtered to separate the cooled refluxed cellulose-hemicellulose-lignin residue from the mixture. Then, the filtered refluxed cellulose-hemicellulose-lignin residue can be washed many times with deionized water. Thereafter, the washed refluxed cellulose-hemicellulose-lignin residue can be air dried for about 6 hours.

In an embodiment, about 6 g of the dried refluxed cellulose-hemicellulose-lignin residue can be dissolved in about 240 mL of dimethyl sulfoxide solvent to obtain a solution. Afterward, triethylamine and the methacrylic anhydride can be added to the solution to obtain a reaction solution mixture and magnetically stirred while the reaction solution mixture was heated at about 50° C. for about 4 days to react the triethylamine and the methacrylic anhydride with the solution to obtain a reacted solution mixture. A ratio of the triethylamine to the methacrylic anhydride can be about 1:4, w/w.

In an additional embodiment, the reacted solution mixture can be poured into about 1 L of an ice-cold solvent comprising isopropanol to obtain a solution mixture and the cellulose-hemicellulose-lignin residue can be separated from the solution mixture via centrifuging to obtain a centrifuged cellulose-hemicellulose-lignin residue.

In another embodiment, the centrifuged cellulose-hemicellulose-lignin residue can be washed several times with ethanol. Subsequently, the washed centrifuged cellulose-hemicellulose-lignin residue can be vacuum dried at about room temperature to obtain dried centrifuged cellulose-hemicellulose-lignin residue.

In an embodiment, about 2 g of the dried centrifuged cellulose-lignin residue can be dissolved in about 20 mL of deionized water within about 100 mL flask to obtain a lignocellulose incorporating methacrylate functionality.

In a further embodiment, the present subject matter relates to a method of making a lignocellulose non-ionic hydrogel which includes obtaining date palm biomass; drying the date palm biomass to obtain a dried date palm biomass; sieving the dried date palm biomass to obtain a sieved date palm biomass; extracting the sieved date palm biomass at a first predetermined temperature (110° C.) to remove waxes and resins from the sieved date palm biomass to obtain an extracted date palm biomass; drying the extracted date palm biomass to obtain a dried extracted date palm biomass; adding an acid to the dried extracted date palm biomass to obtain a mixture and continuously stirring and refluxing the mixture at a second predetermined temperature (100° C.) to obtain a refluxed cellulose-hemicellulose-lignin (lignocellulose) residue; cooling the refluxed cellulose-hemicellulose-lignin residue; dissolving the refluxed cellulose-hemicellulose-lignin residue in a solvent to obtain a solution; adding triethylamine and methacrylic anhydride (methacrylate functionality) to the solution to obtain a reaction solution mixture and stirring while heating the reaction solution mixture to react the triethylamine and the methacrylic anhydride with the solution to obtain a reacted solution mixture; pouring the reacted solution mixture in an ice-cold solvent to obtain a solution mixture and separating cellulose-hemicellulose-lignin residue from the solution mixture via centrifuging to obtain a centrifuged cellulose-hemicellulose-lignin residue; drying the centrifuged cellulose-hemicellulose-lignin residue to obtain a dried centrifuged cellulose-hemicellulose-lignin residue; dissolving the dried centrifuged cellulose-lignin residue in water to obtain a lignocellulose incorporating methacrylate functionality; copolymerizing vinyl acetate with 1,1'-(diselanediylbis(4,1-phenylene))bis(1H-pyrrole-2,5-dione) in a presence of the lignocellulose incorporating methacrylate functionality to obtain a lignocellulose non-ionic hydrogel, and wherein the copolymerization step includes adding polymerization initiators; cutting the lignocellulose non-ionic hydrogel into pieces to obtain lignocellulose non-ionic hydrogel cut pieces; and drying the lignocellulose non-ionic hydrogel cut pieces to obtain dried lignocellulose non-ionic hydrogel cut pieces.

In an aspect, the present subject matter relates to a lignocellulose non-ionic hydrogel prepared by the above method.

In an embodiment, about 200 uL of vinyl acetate can be copolymerized with about 200 uL of 1,1'-(diselanediylbis(4,1-phenylene))bis(1H-pyrrole-2,5-dione) in a presence of the lignocellulose incorporating methacrylate functionality prepared by the above method for about 8 hours to obtain a lignocellulose non-ionic hydrogel. The copolymerization step can include adding the polymerization initiators comprising ammonium peroxodisulfate ($(NH_4)_2S_2O_8$) and sodium metabisulfite ($Na_2S_2O_5$) at a ratio of about 2 wt % of the ammonium peroxodisulfate to about 2 wt % of the sodium metabisulfite.

In an additional embodiment, spurs of the lignocellulose non-ionic hydrogel can be cut into pieces to obtain lignocellulose non-ionic hydrogel cut pieces. Then, the lignocellulose non-ionic hydrogel cut pieces can be dipped into an excess amount of deionized water for about 4 days to get rid of any unreacted materials. The dipped lignocellulose non-ionic hydrogel cut pieces can be dried on a Teflon foil at about 22° C.

In a further embodiment, the present subject matter relates to a method of making a polymeric membrane which includes obtaining date palm biomass; drying the date palm biomass to obtain a dried date palm biomass; sieving the dried date palm biomass to obtain a sieved date palm biomass; extracting the sieved date palm biomass at a first predetermined temperature (110° C.) to remove waxes and resins from the sieved date palm biomass to obtain an extracted date palm biomass; drying the extracted date palm biomass to obtain a dried extracted date palm biomass; adding an acid to the dried extracted date palm biomass to obtain a mixture and continuously stirring and refluxing the mixture at a second predetermined temperature (100° C.) to obtain a refluxed cellulose-hemicellulose-lignin (lignocellulose) residue; cooling the refluxed cellulose-hemicellulose-lignin residue; dissolving the refluxed cellulose-hemicellulose-lignin residue in a solvent to obtain a solution; adding triethylamine and methacrylic anhydride (methacrylate functionality) to the solution to obtain a reaction solution mixture and stirring while heating the reaction solution mixture to react the triethylamine and the methacrylic anhydride with the solution to obtain a reacted solution mixture; pouring the reacted solution mixture in an ice-cold solvent to obtain a solution mixture and separating cellulose-hemicellulose-lignin residue from the solution mixture via centrifuging to obtain a centrifuged cellulose-hemicellulose-lignin residue; drying the centrifuged cellulose-hemicellulose-lignin residue to obtain a dried centrifuged cellulose-hemicellulose-lignin residue; dissolving the dried centrifuged cellulose-lignin residue in water to obtain a lignocellulose incorporating methacrylate functionality copolymerizing vinyl acetate with 1,1'-(diselanediylbis(4,1-phenylene))bis(1H-pyrrole-2,5-dione) in a presence of the lignocellulose incorporating methacrylate functionality to obtain a lignocellulose non-ionic hydrogel, and wherein the copolymerization step includes adding polymerization initiators; cutting the lignocellulose non-ionic hydrogel into pieces to obtain lignocellulose non-ionic hydrogel cut pieces; drying the lignocellulose non-ionic hydrogel cut pieces to obtain dried lignocellulose non-ionic hydrogel cut pieces; adding dimethylformamide (DMF) to the dried lignocellulose non-ionic hydrogel cut pieces within a casting knife to obtain a coating composition; casting the coating composition onto an automatic film applicator to obtain a casted coating composition and immersing the casted coating composition on the automatic film applicator into a coagulation bath to obtain the polymeric membrane; and drying the polymeric membrane to obtain dried polymeric membrane.

In another aspect, the present subject matter relates to a polymeric membrane prepared by the above method.

In an embodiment, dimethylformamide (DMF) can be added to the dried lignocellulose non-ionic hydrogel cut pieces prepared by the above method within a casting knife to obtain a coating composition. In a non-limiting embodiment, the casting knife can have a thickness of about 160 um.

In an additional embodiment, the coating composition can be casted onto a steel sheet of an automatic film applicator to obtain a casted coating composition. The casted coating composition on the steel sheet of the automatic film applicator can be immersed into a coagulation bath filled with distilled water for about 24 hours to obtain a polymeric membrane. The steel sheet of the automatic film applicator can be at a temperate of about 27° C. with a rotational speed of about 6 rpm. In another embodiment, the polymeric membrane can be air dried to obtain dried polymeric membrane.

In a further embodiment, the present subject matter relates to a method of removing pollutants from an aqueous solution, the method includes contacting the polymeric membrane prepared by the above method with the aqueous solution.

In an embodiment, the aqueous solution can include wastewater.

In another embodiment, the pollutants can be selected from the group consisting of cadmium, chromium, lead, copper, zinc, other heavy metals, Rhodamine B, Alizarin red, Indigo carmine, Gentian violet, other organic dyes, phenols, and combinations thereof. The following examples illustrate the present teachings.

EXAMPLES

Example 1

Preparation of a Lignocellulose Incorporating Methacrylate Functionality

The process of making a lignocellulose incorporating methacrylate functionality from date palm biomass was conducted using the following steps.

Preparation of a date palm biomass: Date palm biomass was collected from a palm fruit trunk at the campus of King Faisal University. The date palm biomass contains cellulose, hemicellulose, and lignin. The collected date palm biomass was successively washed with deionized water to remove dust and any unwanted impurities from the date palm biomass. Afterward, the washed date palm biomass was dried at about room temperature to obtain dried date palm biomass. Thereafter, about 100 g of the dried date palm biomass was sieved using about 200 um mesh to obtain a sieved date palm biomass.

Extraction: Subsequently, about 100 g of the sieved date palm biomass was extracted in a presence of a toluene and an ethanol mixture at a first predetermined temperature (110° C.) for about 6 hours via a Soxhlet extractor to remove waxes and resins from the sieved date palm biomass to obtain an extracted date palm biomass. A ratio of the toluene to the ethanol is about 2:1, w/w.

Drying and weighing: The extracted date palm biomass was dried and about 40 g of the dried extracted date palm biomass was weighed.

Refluxing: About 1 L of about 0.1 M hydrochloric acid was added to the about 40 g of the dried extracted date palm biomass within about 2 L flask to obtain a mixture and the mixture was continuously stirred and refluxed at a second predetermined temperature (110° C.) for about 6 hours to obtain a refluxed cellulose-hemicellulose-lignin (lignocellulose) residue. Then, the refluxed cellulose-hemicellulose-lignin residue was cooled.

Filtering, washing, and drying: The cooled refluxed cellulose-hemicellulose-lignin residue was filtered to separate the cooled refluxed cellulose-hemicellulose-lignin residue from the mixture. Then, the filtered refluxed cellulose-hemicellulose-lignin residue was washed many times with deionized water. Thereafter, the washed refluxed cellulose-hemicellulose-lignin residue was air dried for about 6 hours.

Forming a reacted solution mixture: About 6 g of the dried refluxed cellulose-hemicellulose-lignin residue was dissolved in about 240 mL of dimethyl sulfoxide solvent to obtain a solution. Afterward, triethylamine and the methacrylic anhydride were added to the solution to obtain a reaction solution mixture and magnetically stirred while the reaction solution mixture was heated at about 50° C. for about 4 days to react the triethylamine and the methacrylic anhydride with the solution to obtain a reacted solution mixture. A ratio of the triethylamine to the methacrylic anhydride was about 1:4, w/w.

Centrifugation: The reacted solution mixture was poured into about 1 L of an ice-cold solvent comprising isopropanol to obtain a solution mixture and the cellulose-hemicellulose-lignin residue was separated from the solution mixture via centrifuging to obtain a centrifuged cellulose-hemicellulose-lignin residue.

Washing and drying: The centrifuged cellulose-hemicellulose-lignin residue was washed several times with ethanol. Subsequently, the washed centrifuged cellulose-hemicellulose-lignin residue was vacuum dried at about room temperature to obtain dried centrifuged cellulose-hemicellulose-lignin residue.

Dissolving: About 2 g of the dried centrifuged cellulose-lignin residue was dissolved in about 20 mL of deionized water within about 100 mL flask to obtain a lignocellulose incorporating methacrylate functionality.

Example 2

Preparation of a Lignocellulose Non-Ionic Hydrogel

The process of making a lignocellulose non-ionic hydrogel was conducted using the following steps.

Copolymerization: About 200 uL of vinyl acetate was copolymerized with about 200 uL of 1,1'-(diselanediylbis(4,1-phenylene))bis(1H-pyrrole-2,5-dione) in a presence of the lignocellulose incorporating methacrylate functionality prepared by the above method for about 8 hours to obtain a lignocellulose non-ionic hydrogel. The copolymerization step included adding the polymerization initiators comprising ammonium peroxodisulfate ($(NH_4)_2S_2O_8$) and sodium metabisulfite ($Na_2S_2O_5$) at a ratio of about 2 wt % of the ammonium peroxodisulfate to about 2 wt % of the sodium metabisulfite. The 1,1'-(diselanediylbis(4,1-phenylene))bis (1H-pyrrole-2,5-dione) has the following chemical structure:

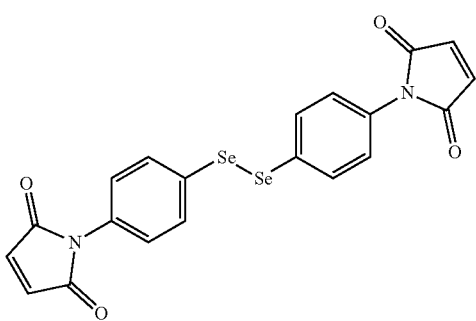 [SMILES: O=C1C=CC(=O)N1c1ccc([Se][Se]c2ccc(N3C(=O)C=CC3=O)cc2)cc1]

Cutting and dipping: Spurs of the lignocellulose non-ionic hydrogel were cut into pieces to obtain lignocellulose non-ionic hydrogel cut pieces. Then, the lignocellulose non-ionic hydrogel cut pieces were dipped into an excess amount of deionized water for about 4 days to get rid of any unreacted materials.

Drying: The dipped lignocellulose non-ionic hydrogel cut pieces were dried on a Teflon foil at about 22° C.

Example 3

Preparation of a Polymeric Membrane

The process of making a polymeric membrane was conducted using the following steps.

Preparation of coating composition: Dimethylformamide (DMF) was added to the dried lignocellulose non-ionic hydrogel cut pieces prepared by the above method within a casting knife to obtain a coating composition. The casting knife had a thickness of about 160 um.

Casting and immersing: The coating composition was casted onto a steel sheet of an automatic film applicator to obtain a casted coating composition. The casted coating composition on the steel sheet of the automatic film applicator was immersed into a coagulation bath filled with distilled water for about 24 hours to obtain a polymeric membrane. The steel sheet of the automatic film applicator was at a temperate of about 27° C. with a rotational speed of about 6 rpm. The process of forming the polymeric member is known as a phase inversion technique.

Drying: The polymeric membrane was air dried to obtain dried polymeric membrane.

Example 4

Removal of Non-Ionic Surfactants Experiment

In this experiment, a vacuum filtration was carried out whereby about 20 mL of various mass fractions (0 wt %, about 0.00274 wt %, and about 0.01233 wt %) of commercially available marlophen NP5 was allowed to pass through the dried polymeric membrane prepared by the above method under vacuum pressure at about 2 bars. The dried polymeric membrane had an area of about 16 cm³. The marlophen NP5 is a non-ionic surfactant which has the following chemical structure:

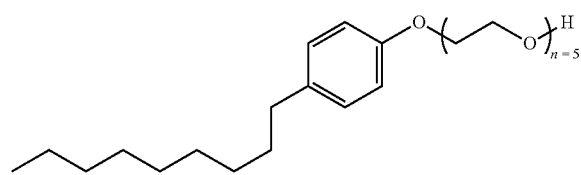

After vacuum filtration, the polymeric membrane was analyzed using energy-dispersive X-ray spectroscopy (EDS) and scanning electron microscopy (SEM).

UV-Vis spectrophotometer was used to measure the marlophen NP5 concentration at a wavelength of about 277 nm, where the benzene ring of marlophen adsorbs most strongly. As standard, solvent $H_2O$ was used. The calibration equation below represents a linear relationship between the light absorption and concentration % (OK):

$\gamma = 0.1527A - 0.0007$ with $R^2 = 0.992$

It is to be understood that the method of making a lignocellulose incorporating methacrylate functionality from date palm biomass, the method of making a lignocellulose non-ionic hydrogel, the method of making a polymeric membrane, and the method of removing pollutants from an aqueous solution are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a lignocellulose incorporating methacrylate functionality from date palm biomass, wherein the lignocellulose comprises cellulose-hemicellulose-lignin, the method comprising:
 obtaining date palm biomass;
 drying the date palm biomass to obtain a dried date palm biomass;
 sieving the dried date palm biomass to obtain a sieved date palm biomass;
 extracting the sieved date palm biomass at a first temperature of 110° C. to remove waxes and resins from the sieved date palm biomass to obtain an extracted date palm biomass;
 drying the extracted date palm biomass to obtain a dried extracted date palm biomass;
 adding an acid to the dried extracted date palm biomass to obtain a mixture and continuously stirring and refluxing the mixture at a second temperature of 110° C. to obtain a refluxed lignocellulose residue;
 cooling the refluxed lignocellulose residue;
 dissolving the refluxed lignocellulose residue in a solvent to obtain a solution;
 adding triethylamine and methacrylic anhydride to the solution to obtain a reaction solution mixture and stirring while heating the reaction solution mixture to react the triethylamine and the methacrylic anhydride with the solution to obtain a reacted solution mixture to provide methacrylate functionality to the lignocellulose;
 pouring the reacted solution mixture into an ice-cold solvent to obtain a solution mixture and separating lignocellulose residue from the solution mixture via centrifuging to obtain a centrifuged lignocellulose residue;
 drying the centrifuged lignocellulose residue to obtain a dried centrifuged lignocellulose residue; and
 dissolving the dried centrifuged lignocellulose residue in water to obtain the lignocellulose incorporating methacrylate functionality.

2. The method of claim 1, wherein the extracted date palm biomass is prepared by extracting about 100 g of the sieved date palm biomass in a presence of a toluene and an ethanol mixture at the first temperature for about 6 hours via a Soxhlet extractor to remove the waxes and the resins from the sieved date palm biomass, and wherein a ratio of the toluene to the ethanol is about 2:1, w/w.

3. The method of 1, wherein the refluxed lignocellulose residue is prepared by adding about 1 L of about 0.1 M hydrochloric acid to about 40 g of the dried extracted date palm biomass to obtain the mixture and continuously stirring and refluxing the mixture at the second temperature for about 6 hours.

4. The method of claim 1, wherein the solution is prepared by dissolving about 6 g of the refluxed lignocellulose residue in about 240 mL of dimethyl sulfoxide solvent.

5. The method of claim 1, wherein the reacted solution mixture is prepared by adding the triethylamine and the methacrylic anhydride to the solution to obtain the reaction solution mixture and magnetically stirring while heating the reaction solution mixture at about 50° C. for about 4 days to react the triethylamine and the methacrylic anhydride with the solution, and wherein a ratio of the triethylamine to the methacrylic anhydride is about 1:4, w/w.

6. The method of claim 1, wherein the centrifuged lignocellulose residue is prepared by pouring the reacted solution mixture into about 1 L of the ice-cold solvent comprising isopropanol to obtain the solution mixture and separating the lignocellulose residue from the solution mixture via centrifuging.

7. The method of claim 1, wherein the lignocellulose incorporating methacrylate functionality is prepared by dissolving about 2 g of the dried centrifuged cellulose-lignin residue in about 20 mL of deionized water.

8. A method of making a lignocellulose non-ionic hydrogel, wherein the lignocellulose comprises cellulose-hemicellulose-lignin, the method comprising:
 obtaining date palm biomass;
 drying the date palm biomass to obtain a dried date palm biomass;
 sieving the dried date palm biomass to obtain a sieved date palm biomass;
 extracting the sieved date palm biomass at a first temperature of 110° C. to remove waxes and resins from the sieved date palm biomass to obtain an extracted date palm biomass;
 drying the extracted date palm biomass to obtain a dried extracted date palm biomass;
 adding an acid to the dried extracted date palm biomass to obtain a mixture and continuously stirring and refluxing the mixture at a second predetermined-temperature of 100° C. to obtain a refluxed lignocellulose residue;
 cooling the refluxed lignocellulose residue;
 dissolving the refluxed lignocellulose residue in a solvent to obtain a solution;
 adding triethylamine and methacrylic anhydride to the solution to obtain a reaction solution mixture and stirring while heating the reaction solution mixture to react the triethylamine and the methacrylic anhydride with the solution to obtain a reacted solution mixture to provide methacrylate functionality to the lignocellulose;
 pouring the reacted solution mixture in an ice-cold solvent to obtain a solution mixture and separating lignocellulose residue from the solution mixture via centrifuging to obtain a centrifuged lignocellulose cellulose hemicellulose lignin residue;
 drying the centrifuged lignocellulose residue to obtain a dried centrifuged lignocellulose residue;
 dissolving the dried centrifuged lignocellulose residue in water to obtain a lignocellulose incorporating methacrylate functionality;
 copolymerizing vinyl acetate with 1,1'-(diselanediylbis(4,1-phenylene))bis(1H-pyrrole-2,5-dione) with the lignocellulose incorporating methacrylate functionality to obtain a lignocellulose non-ionic hydrogel, and wherein the copolymerization step includes adding polymerization initiators;
 cutting the lignocellulose non-ionic hydrogel into pieces to obtain lignocellulose non-ionic hydrogel cut pieces; and
 drying the lignocellulose non-ionic hydrogel cut pieces to obtain dried lignocellulose non-ionic hydrogel cut pieces.

9. The method of claim 8, wherein the lignocellulose non-ionic hydrogel is prepared by copolymerizing about 200 µL of the vinyl acetate with about 200 uL of the 1,1'-(diselanediylbis(4,1-phenylene))bis(1H-pyrrole-2,5-dione) with the lignocellulose incorporating methacrylate functionality for about 8 hours, and wherein the copolymerization step includes adding the polymerization initiators comprising ammonium peroxodisulfate ($(NH_4)_2S_2O_8$) and sodium metabisulfite ($Na_2S_2O_5$) at a ratio of about 2 wt % of the ammonium peroxodisulfate to about 2 wt % of the sodium metabisulfite.

10. The method of claim 8, wherein the lignocellulose non-ionic hydrogel cut pieces are prepared by cutting spurs of the lignocellulose non-ionic hydrogel into pieces.

11. The method of claim 8, wherein the lignocellulose non-ionic hydrogel cut pieces are dipped into an excess amount of deionized water for about 4 days prior to the drying step.

12. The method of claim 8, wherein the dried lignocellulose non-ionic hydrogel cut pieces are prepared by drying the lignocellulose non-ionic hydrogel cut pieces on a Teflon foil at about 22° C.

13. A method of making a polymeric membrane, the method comprising:
- obtaining date palm biomass;
- drying the date palm biomass to obtain a dried date palm biomass;
- sieving the dried date palm biomass to obtain a sieved date palm biomass;
- extracting the sieved date palm biomass at a first temperature of 110° C. to remove waxes and resins from the sieved date palm biomass to obtain an extracted date palm biomass;
- drying the extracted date palm biomass to obtain a dried extracted date palm biomass;
- adding an acid to the dried extracted date palm biomass to obtain a mixture and continuously stirring and refluxing the mixture at a second temperature of 100° C. to obtain a refluxed lignocellulose residue;
- cooling the refluxed lignocellulose residue;
- dissolving the refluxed lignocellulose residue in a solvent to obtain a solution;
- adding triethylamine and methacrylic anhydride to the solution to obtain a reaction solution mixture and stirring while heating the reaction solution mixture to react the triethylamine and the methacrylic anhydride with the solution to obtain a reacted solution mixture to provide methacrylate functionality to the lignocellulose;
- pouring the reacted solution mixture in an ice-cold solvent to obtain a solution mixture and separating lignocellulose residue from the solution mixture via centrifuging to obtain a centrifuged lignocellulose cellulose hemicellulose lignin residue;
- drying the centrifuged lignocellulose residue to obtain a dried centrifuged lignocellulose cellulose hemicellulose lignin residue;
- dissolving the dried centrifuged lignocellulose residue in water to obtain a lignocellulose incorporating methacrylate functionality;
- copolymerizing vinyl acetate with 1,1'-(diselanediylbis(4,1-phenylene))bis(1H-pyrrole-2,5-dione) with the lignocellulose incorporating methacrylate functionality to obtain a lignocellulose non-ionic hydrogel, and wherein the copolymerization step includes adding polymerization initiators;
- cutting the lignocellulose non-ionic hydrogel into pieces to obtain lignocellulose non-ionic hydrogel cut pieces;
- drying the lignocellulose non-ionic hydrogel cut pieces to obtain dried lignocellulose non-ionic hydrogel cut pieces;
- adding dimethylformamide (DMF) to the dried lignocellulose non-ionic hydrogel cut pieces within a casting knife to obtain a coating composition;
- casting the coating composition onto an automatic film applicator to obtain a casted coating composition and immersing the casted coating composition on the automatic film applicator into a coagulation bath to obtain the polymeric membrane; and
- drying the polymeric membrane to obtain dried polymeric membrane.

14. The method of claim 13, wherein the polymeric membrane is prepared by casting the coating composition onto a steel sheet of the automatic film applicator to obtain the casted coating composition and immersing the casted coating composition on the steel sheet of the automatic film applicator into the coagulation bath filled with distilled water for about 24 hours, and wherein the steel sheet of the automatic film applicator is at a temperate of about 27° C. with a rotational speed of about 6 rpm.

\* \* \* \* \*

UNITED STATES PATENT AND TRADEMARK OFFICE
CERTIFICATE OF CORRECTION

| | |
|---|---|
| PATENT NO. | : 12,084,533 B1 |
| APPLICATION NO. | : 18/581246 |
| DATED | : September 10, 2024 |
| INVENTOR(S) | : Saad Shaaban et al. |

It is certified that error appears in the above-identified patent and that said Letters Patent is hereby corrected as shown below:

On the Title Page

Item (72)
Please remove Inventor 2 residence "Liverpool (GB)" and replace with "Al-Ahsa (SA)".
Please remove Inventor 3 residence "Liverpool (GB)" and replace with "Al-Ahsa (SA)".
Please remove Inventor 4 residence "Al-Ahsa (SA)" and replace with "Riyadh (SA)".

Signed and Sealed this
Fifth Day of November, 2024

Katherine Kelly Vidal
*Director of the United States Patent and Trademark Office*